Sept. 1, 1953　　　　　D. E. BROWN　　　　　2,650,650
ARMREST ATTACHMENT FOR VEHICLE SEATS
Filed Feb. 3, 1950
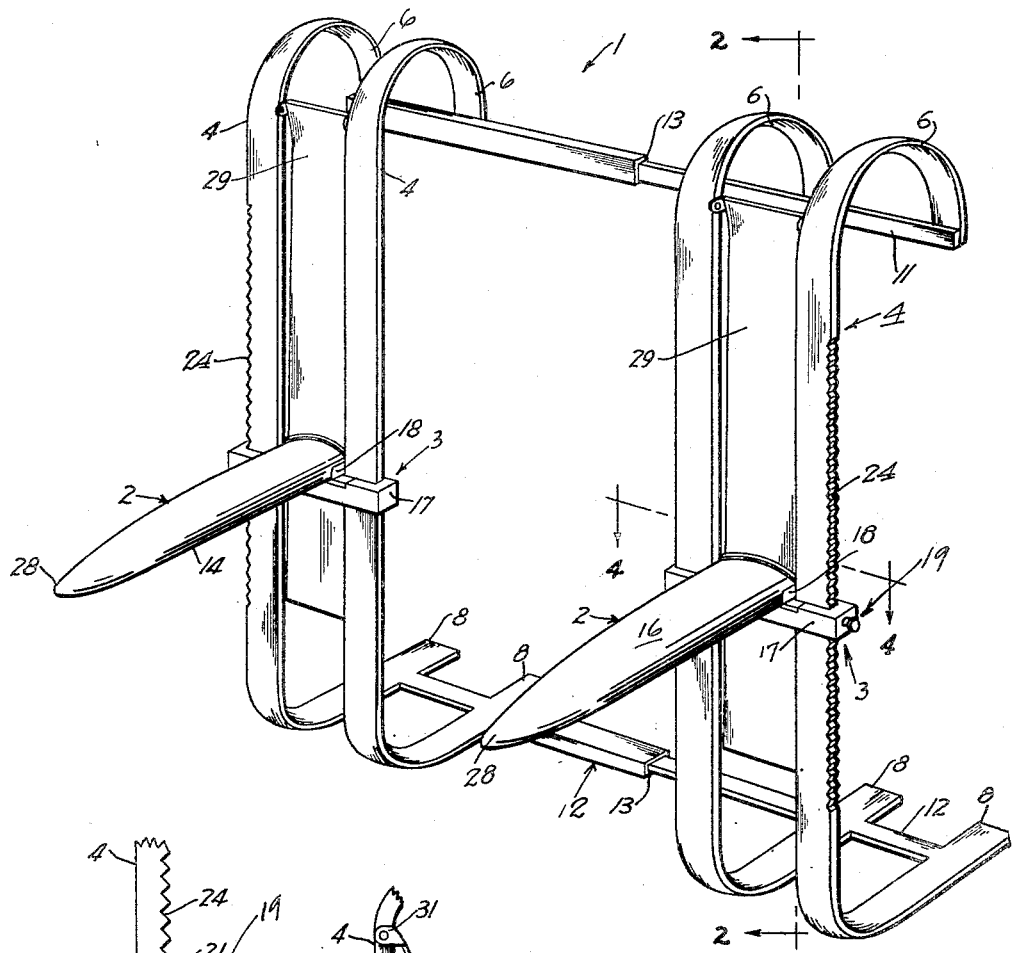
FIG_1_
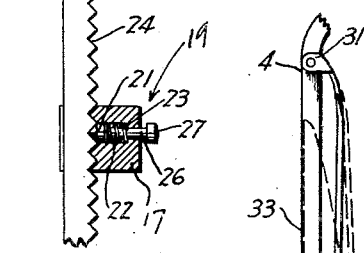
FIG_3_
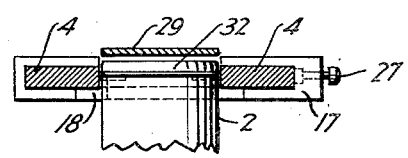
FIG_4_
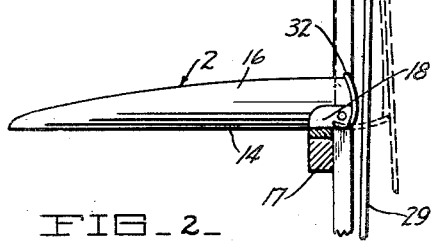
FIG_2_
INVENTOR
Derrell E. Brown
George B White
ATTORNEY Patented Sept. 1, 1953

2,650,650

UNITED STATES PATENT OFFICE 2,650,650

ARMREST ATTACHMENT FOR VEHICLE SEATS

Derrell E. Brown, Pacific Grove, Calif.

Application February 3, 1950, Serial No. 142,166

5 Claims. (Cl. 155—112)

This invention relates to an armrest attachment, and particularly to an armrest for the front seats of automobiles and the like.

The primary object of this invention is to provide an armrest for automobile seat which can be quickly and easily attached to such automobile seat and positively held in place in a selected convenient position, and which can be folded into an out of way position at will.

Features of my invention include: a frame for the armrest which can be placed over the back of an automobile seat and which is so shaped that it engages the seat back firmly and is held against movement relatively to the seat back; foldable armrests on the frame; means to adjustably support the arm rest on the frame so as to locate the armrest at convenient height for the occupant of the seat; a device for folding the seat level with the back of the seat by indenting the seat back to form a recess for the armrest every time the arm rest is folded.

I am aware that some changes may be made in the general arrangements of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 1 is a perspective view of my armrest attachment.

Fig. 2 is a sectional view of the section being taken on the lines 2—2 of Fig. 1.

Fig. 3 is a sectional detail view of the snap catch for the rest adjustment, and Fig. 4 is a sectional view taken on the lines 4—4 of Fig. 1.

In carrying out my invention I make use of a frame 1, armrest 2 pivotally or foldably mounted on the frame 1, and a device 3 for adjustably mounting the arm rests on the frame 1.

The frame 1 in general includes a pair of spaced generally parallel clamp rails 4. Each clamp rail 4 is curved at the top into a bow 6, preferably resilient, to fit over the top of the seat back. The lower end of each clamp rail 4 is bent toward the same side as said bow 6, and forms a leg 8 adapted to be inserted at the base of the seat back into abutment with the seat frame 9. A cross bar 11 connects the inner ends of the bows 6. Another cross bar 12 connects and spaces the legs 8 at the lower ends of the rails. In general as the bows 6 are placed over the seat back top and the rails 4 are swung down, and the legs 8 are forced under the base of the seat back to clamp the frame 1 in place. The distance between the bow and the legs is slightly less than the height of the seat back so as to cause the frame to press upon the seat back. The top cross bar 11, pressing forwardly and slightly upwardly, exerts a pull on the bottom cross bar 12 to hold it firmly clamped in place.

In order to render the space between the armrests 2 adjustable to suit the occupant of the seat, the cross bars 11 and 12 are made longitudinally adjustable. For instance a telescoping joint 13 of suitable tube sections forming the cross bars 11 and 12 allows adjustment of the frame width before the frame 1 is clamped over the seat back.

Each armrest 2 includes a frame strip 14, on which is the usual, suitable padding 16 so arranged as to permit folding of the armrest up toward the seat back.

The clamp rails 4 at each side of the frame 1 are formed by parallel strips spaced from one another. The spacing between the parallel strips is of a width to permit the concealing of the armrest 2 therebetween in the upright position. The armrest 2 is supported on a pivot bracket 17 which bracket extends across the parallel strips of each clamp rail 4 and is vertically slidable into selected positions. The armrest frame strip 14 is pivoted on pivot lugs 18 extended from the top of the bracket 17. When the armrest 2 is turned down to the operative position, its frame strip 14 rests on the bracket 17. The bracket 17 in turn is held in vertically adjusted position by means of a snap catch 19.

The snap catch 19 includes a plunger pin 21 slidable in a socket 22 on the inside of the bracket 17 and pressed by a coil spring 23 into engagement with the serrations of a rack 24 on the edge of one of the strips of a clamp rail 4. A stem 26 extends from the plunger 21 to the outside of the bracket 17 and has a button 27 thereon whereby the plunger pin 21 can be pulled out of engagement from the rack 24 so as to permit the sliding of the bracket 17 and the armrest 2 to a selected height convenient to the user. By releasing the plunger pin 21 the bracket 17 is locked at the selected height.

When the armrest 2 is swung up into its out of the way position, it is concealed between the strips of the respective clamp rails 4. The armrest 2 can be made of comparatively narrow padding which is tapered toward the point 28 of the armrest 2. In order to prevent the wearing out of the automobile seat and to provide a convenient unit, a wear plate 29 is arranged behind the space between the strips of each clamp rail 4. This wear plate 29 is curved at its top toward the clamp rail 4 and has its curved top end provided with pivots 31 for swingably securing the wear plate 29 in place. The lower end of the wear plate 29 is free. The armrest 2 is provided at its pivoted end with a cam shoe 32 which extends slightly beyond the top surface of the armrest 2 at the base so that when the armrest is turned up to the out of the way position, the tip of the cam shoe 32 engages the wear plate 29 and presses it inwardly against the seat back. The tip of the cam shoe 32 in the upright and concealed position of the armrest 2 is over and below the center of the armrest pivot so that the spring action of the back seat exerted upon the wear plate 29 tends to turn the cam shoe 32 downwardly and thereby hold the armrest 2 in the concealed position. The thickness of the armrest 2 with relation to the pivot lug 18 is such that the bottom 33 of the arm rest is substantially aligned with the outer surfaces of the clamp rails 4.

My device is very simple and it can be quickly adapted to the backs of automobile seats and is held there positively between the clamp bow at the top and the legs under the seat back. The heights of the armrests on the frame are easily adjustable. The armrests can be quickly moved into inoperative position and held concealed when not needed. The frame can be adjusted to the width of the person using it. The device is light and simple and eminently adapted for its purposes.

I claim:

1. An armrest attachment for an automobile seat comprising a frame formed of spaced clamping elements adapted to engage the top and base of a seat back and connecting elements between said spaced clamping elements; and an armrest supported on each clamping element, said armrest being foldable to said seat back into an out of the way position, said connecting elements being adjustable to vary the spacing between said clamping elements.

2. An armrest attachment for an automobile seat comprising spaced pairs of clamping strips adapted to engage the top and base of the back of an automobile seat, connecting elements holding said clamping strips spaced, at least one armrest supported on a pair of said clamping strips and being foldable into the space between the adjacent strips, a bow on each clamping strip fitting over the top of said seat back, and a leg on each clamping strip extended generally parallel with said bow to engage the base of said seat back, one of said connecting elements being extended substantially between the free ends of said bows, the other connecting element being extended between said legs under said base.

3. An armrest attachment for an automobile seat comprising spaced pairs of clamping strips adapted to engage the top and base of the back of an automobile seat, connecting elements holding said clamping strips spaced, at least one armrest supported on one of said pairs of strips and fitting into the space between adjacent strips of said pair, a support adjustable on said pair of strips to support said armrest in a generally horizontal position swingably to a substantially vertical position, and a releasable catch device to hold said support in adjusted position.

4. An armrest attachment for an automobile seat comprising spaced pairs of clamping strips adapted to engage the top and base of the back of an automobile seat, connecting elements holding said clamping strips spaced, each pair of clamping strips supporting an armrest, said armrest fitting into the space between the strips of its supporting pair of clamping strips, a support adjustable on each pair of strips, pivotal connection between each armrest and its support to hold said armrest in generally horizontal position with freedom of upward swinging to a substantially vertical position between the strips of its supporting pair of clamping strips, a wear plate behind each pair of strips adapted to be pressed against the seat back, and a cam shoe on each armrest for pressing the adjacent wear plate into the seat back when the armrest is turned to vertical position to form a pocket for concealing said armrest.

5. An armrest attachment for an automobile seat comprising spaced pairs of clamping strips adapted to engage the top and base of the back of an automobile seat, connecting elements holding said clamping strips spaced, each pair of clamping strips supporting an armrest, said armrest fitting into the space between the strips of its supporting pair of clamping strips, a support adjustable on each pair of strips, pivotal connection between each armrest and its support to hold said armrest and one of said supports to hold said armrest in generally horizontal position with freedom of upward swinging to a substantially vertical position between the strips of its supporting pair of clamping strips, a wear plate behind each pair of strips adapted to be pressed against the seat back, a cam shoe on each armrest for pressing the adjacent wear plate into the seat back when the armrest is turned to vertical position to form a pocket for concealing said armrest, and a releasable catch device to hold said support in adjusted position.

DERRELL E. BROWN.

References Cited in the file of this patent

UNITED STATES PATENTS

| Number | Name | Date |
|---|---|---|
| 1,742,822 | Olson | Jan. 7, 1930 |
| 1,750,435 | Silver | Mar. 11, 1930 |
| 2,256,944 | Fall | Sept. 23, 1941 |
| 2,288,692 | Fearson | July 7, 1942 |